United States Patent

Younger

[11] 3,963,114
[45] June 15, 1976

[54] CONVEYOR BELT DRIVE ASSEMBLY
[75] Inventor: Joseph J. Younger, Paintsville, Ky.
[73] Assignee: Continental Conveyor and Equipment Company, Winfield, Ala.
[22] Filed: May 12, 1975
[21] Appl. No.: 576,791

[52] U.S. Cl. .................................. 198/203; 74/221; 100/168; 198/191
[51] Int. Cl.² ................................ B65G 23/00
[58] Field of Search ............. 198/203, 191; 74/221; 100/168, 169, 170, 171

[56] References Cited
UNITED STATES PATENTS
3,763,993  10/1973  Whikehart et al. ............. 198/203
3,773,167  11/1973  McGinnis ......................... 198/203

FOREIGN PATENTS OR APPLICATIONS
1,204,474  8/1959  France ........................... 100/171

Primary Examiner—Evon C. Blunk
Assistant Examiner—Douglas D. Watts
Attorney, Agent, or Firm—Woodford R. Thompson, Jr.

[57] ABSTRACT

A conveyor belt drive assembly embodying a supporting frame extending transversely of the belt. A pair of transverse drive axles mounted in the supporting frame are spaced from each other in the direction of belt travel. Drive wheels on the drive axles engage the under surfaces of the edges of the upper strand of the belt and the upper surfaces of the edges of the lower strand. A resiliently mounted rotatable support engages the under surfaces of the edges of the lower strand opposite the drive wheels with the lower strand pinched therebetween. A floating frame operatively connected to the supporting frame is movable relative thereto. Upper wheels carried by transverse axles on the floating frame engage the upper surfaces of the edges of the upper strand opposite the drive wheels with the upper strand pinched therebetween. Downward pressure is applied to the floating frame at a pivot point substantially equidistant from the upper wheels with the floating frame being adapted to swivel about the pivot point to selected positions relative to the upper strand.

19 Claims, 20 Drawing Figures

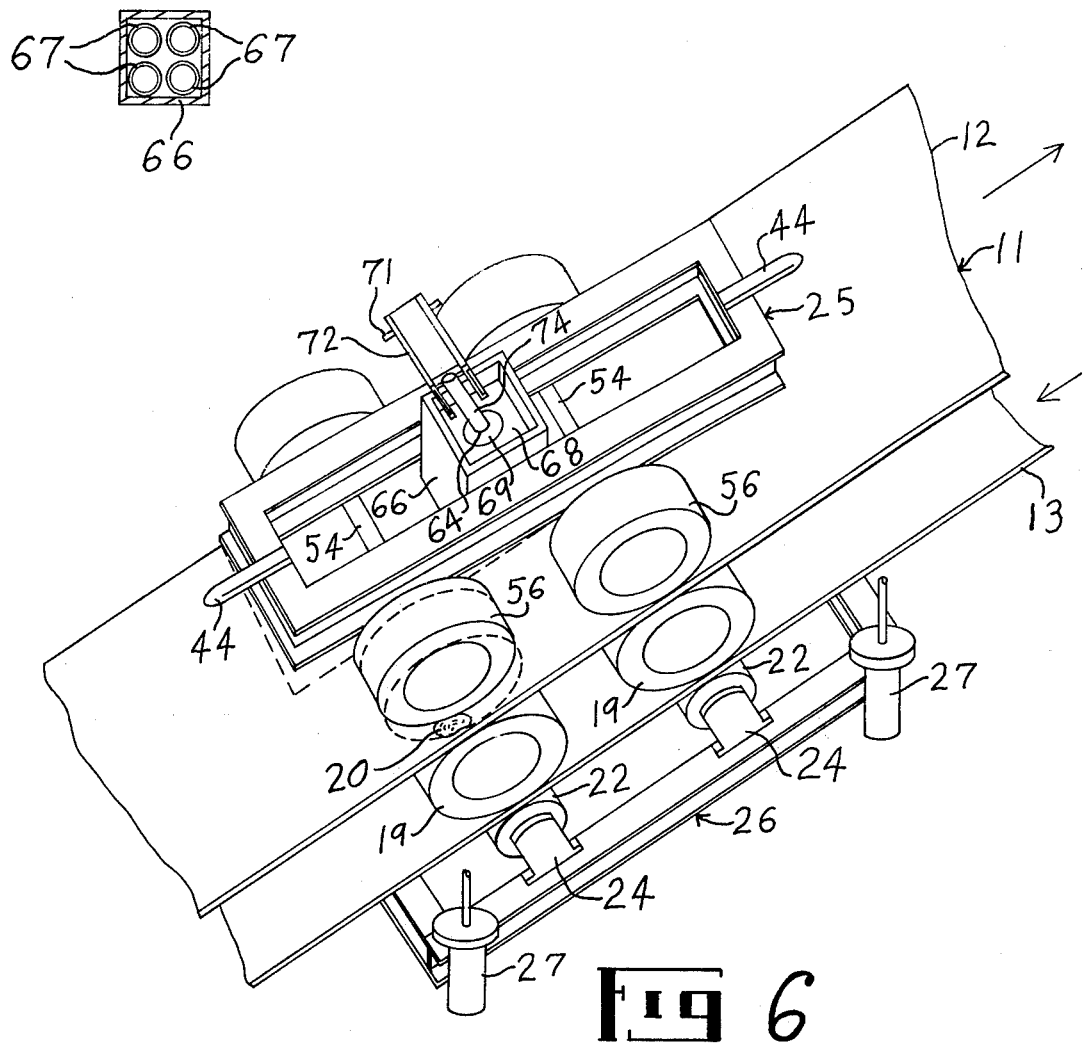
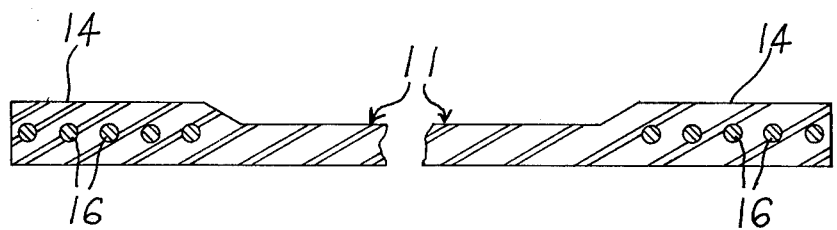

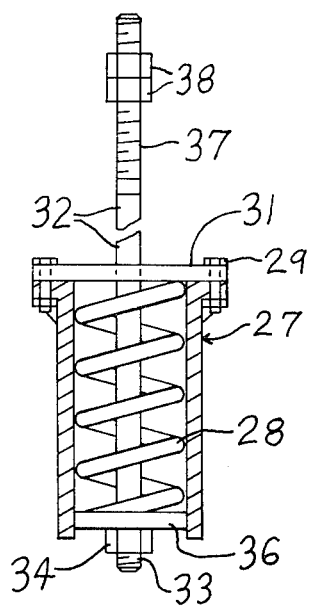
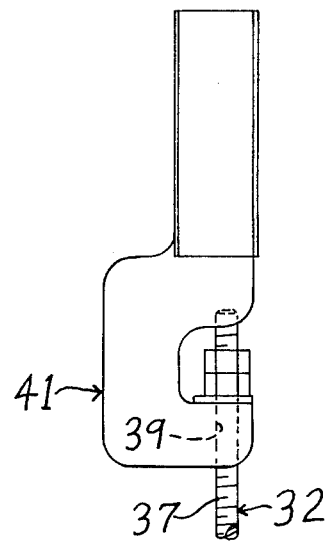
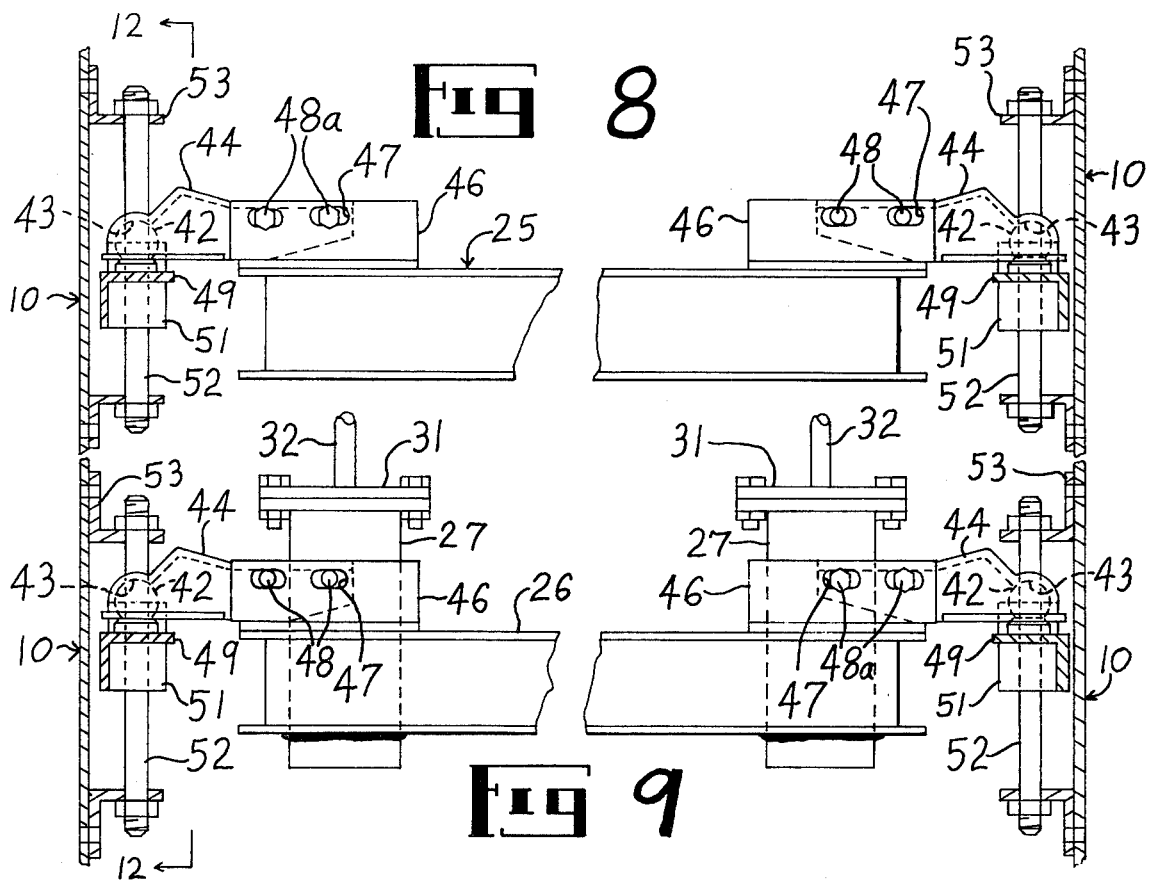

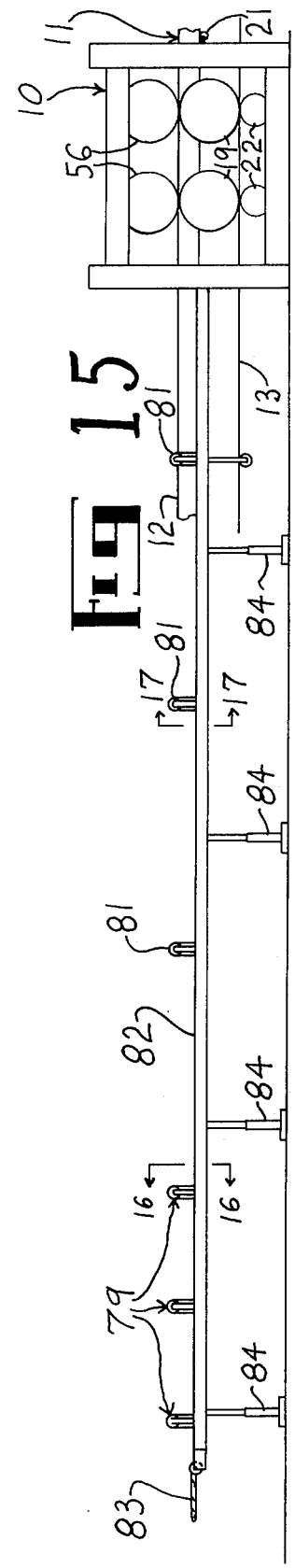
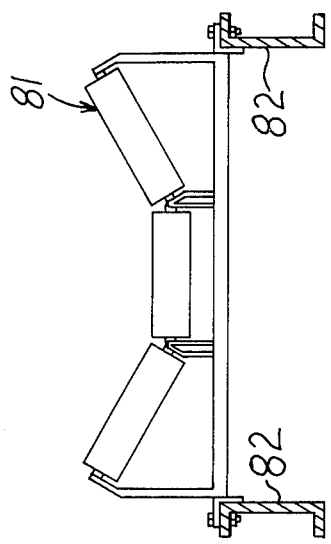
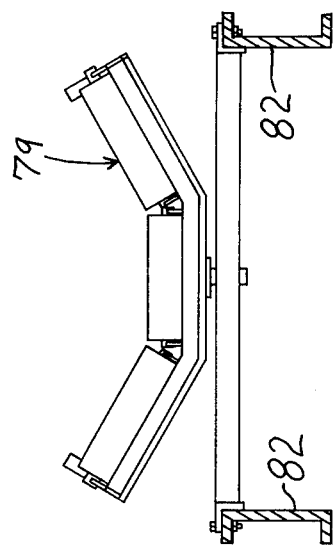

CONVEYOR BELT DRIVE ASSEMBLY

BACKGROUND OF THE INVENTION frictional

This invention relates to a conveyor belt drive assembly and more particularly to apparatus for driving an endless conveyor belt having upper and lower strands with marginal drive edges thereon which are engaged by driving wheels to provide a pinch roll drive. These drive assemblies are located at intervals along the belt whereby the belt is driven by frctional engagement of the driving wheels with the marginal drive edges of the belt.

Heretofore in the art to which may invention relates, difficulties have been encountered in applying a uniform pressure to the drive wheels and at the same time permit the individual drive wheels and upper wheels to be released relative to the marginal drive edge of the belt when material, such as a lump of coal, ore or the like being conveyed, passes under the upper wheels or drive wheels. Accordingly, the marginal drive edge of the conveyor belt is severely damaged where hard objects, such as rocks, coal, ore and the like, dig into the belt as the wheels pass over such an object along the marginal drive edge of the belt.

Difficulties have also been encountered with previously designed pinch roll drive assemblies for endless conveyor belts due to the fact that the wheels which engage the marginal drive edges of the belt are supported by bearing units mounted outwardly of the wheels, thus making it difficult to assemble and disassemble the wheels.

BRIEF SUMMARY OF THE INVENTION

In accordance with my invention, I provide a conveyor belt drive asssembly which is adapted to engage the marginal drive edges of an endless conveyor belt at a plurality of points along the course traversed by the endless belt intermediate the head and tail pulleys. The assembly comprises a supporting frame which extends transversely of the belt and supports a pair of transverse drive axles which are spaced from each other in the direction of belt travel. Drive wheels on the drive axles engage the under surfaces of the marginal edges of the upper strand of the belt and the upper surfaces of the edges of the lower strand. The under surfaces of the edges of the lower strand opposite the drive wheels are engaged by a resiliently supported rotatable support, such as lower wheels or a roller, with the lower strand pinched therebetween. A floating frame above the upper strand is operatively connected to the supporting frame and is movable relative thereto. Transverse axles on the floating frame carry upper wheels which engage the upper surfaces of the edges of the upper strand opposite the drive wheels with the belt pinched therebetween. Downward pressure is applied to the floating frame at a pivot point substantially equidistant from the upper wheels with the floating frame being adapted to swivel about the pivot point to selected positions relative to the upper strand. Accordingly, I provide a pair of spaced apart drive axles with drive wheels adjacent each end thereof which cooperate with wheels carried by the upper floating frame and with the lower rotatable supports or wheels to thus drive both the upper strand and the lower strand of the belt and at the same time provide eight drive contact points for each drive assembly.

DESCRIPTION OF THE DRAWINGS

Apparatus embodying features of my invention is illustrated in the accompanying drawings, forming a part of this application, in which:

FIG. 5 is a sectional view taken generally along the line 5—5 of FIG. 4;

FIG. 6 is a perspective view, partly broken away and parts being omitted for the sake of clarity and showing the floating frame in position for one of its supporting wheels to pass over an object carried by the marginal drive edge of the conveyor belt;

FIG. 7 is an enlarged, transverse sectional view through the endless belt, partly broken away;

FIG. 8 is an enlarged, fragmental, sectional view showing the manner in which the floating frame is operatively connected to the supporting frame and is adapted for movement relative thereto;

FIG. 9 is a fragmental, sectional view, partly broken away, showing the resiliently mounted frame for supporting the rotatable support member which is mounted beneath the lower strand of the belt;

FIG. 10 is an enlarged, sectional view showing the resilient means for supporting the resiliently mounted frame which carries the rotatable support for the lower strand of the conveyor belt;

FIG. 11 is an enlarged, fragmental view showing the support bracket for the upper end of the resilient member shown in FIG. 10;

FIG. 15 is a side elevational view, drawn to a small scale, showing guide means which directs the conveying flight of the conveyor belt into the belt drive assembly;

FIG. 16 is an enlarged sectional view taken generally along the line 16—16 of FIG. 15;

FIG. 17 is an enlarged sectional view taken generally along the line 17—17 of FIG. 15;

DETAILED DESCRIPTION

Figure 2:
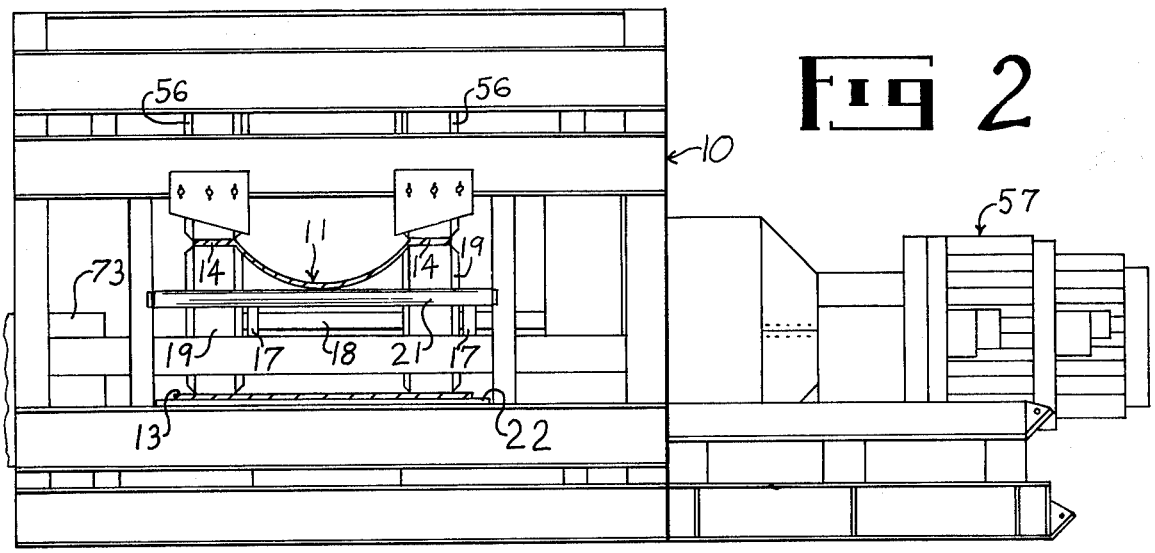
FIG. 2 is an end elevational view of the apparatus shown in FIG. 1.

Referring now to the drawings for a better understanding of my invention, I show a supporting frame 10 which extends transversely of an endless conveyor belt 11 having an upper strand 12 and a lower strand 13 with marginal drive edges 14 thereon, as shown in FIG. 7. The marginal drive edges 14 may be thickened, as shown, and the belt 11 is reinforced longitudinally by providing high strength steel cables 16 in the marginal edges 14. The cables 16 are embedded in and bonded to the material forming the belt 11. The belt 11 is formed of a suitable resilient material, such as rubber or a similar elastomeric material which is reinforced in the usual manner. In view of the fact that such conveyor belts are well known in the art to which my invention relates, no further description thereof is deemed necessary.

Figure 1:
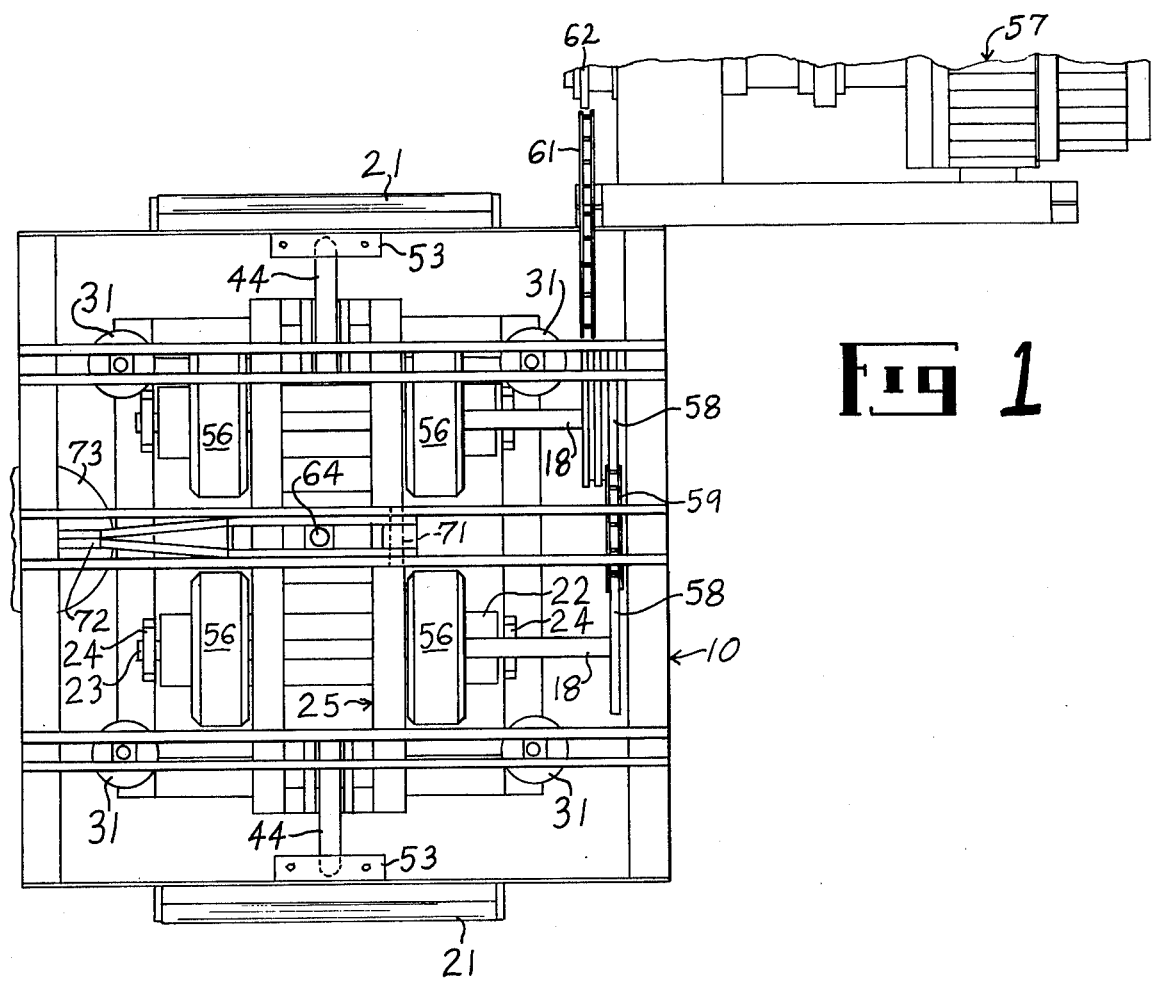
FIG. 1 is a top plan view, partly broken away.
Figure 4:
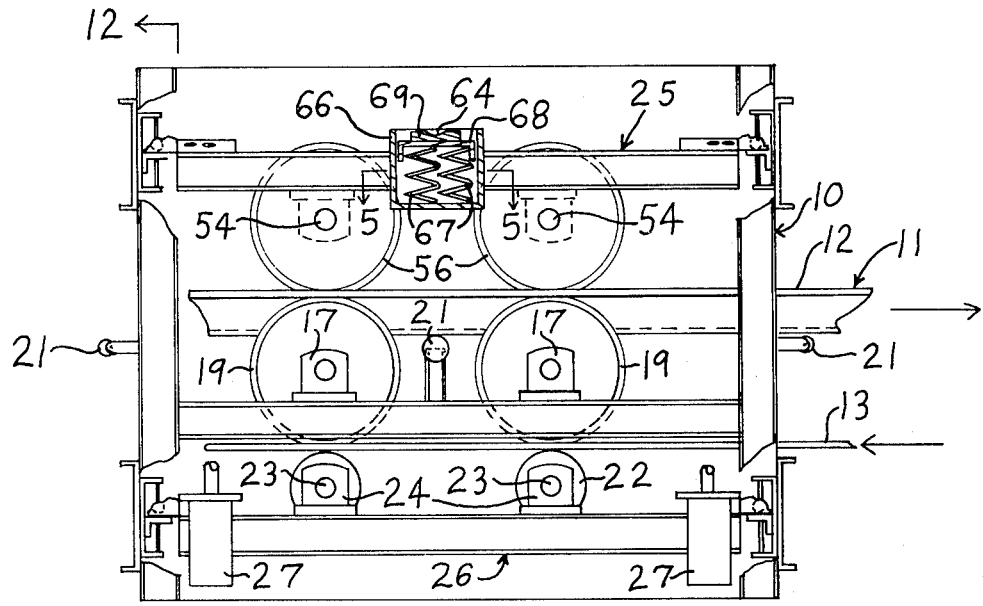
FIG. 4 is a side elevational view as viewed from the right side of FIG. 3 with parts broken away and in section and with parts being omitted, for the sake of clarity.

Mounted in the supporting frame 10 on suitable bearings 17 is a pair of drive axles 18 which are spaced from each other in the direction of travel of the conveyor belt 11, as shown in FIGS. 1 and 4. Also, the drive axles 18 extend transversely of the direction of travel of the belt 11. Drive wheels 19 are mounted on each of the drive axles 18 in position to engage the under surface of the marginal drive edges 14 of the upper strand 12 and for driving engagement with the upper surface of the marginal drive edges 14 of the lower strand 13. Also, suitable idler rolls 21 are carried by the supporting frame 10 in longitudinal spaced relation to the wheels 19 to add additional support to the upper strand 12 of the conveyor belt 11.

Figure 3:
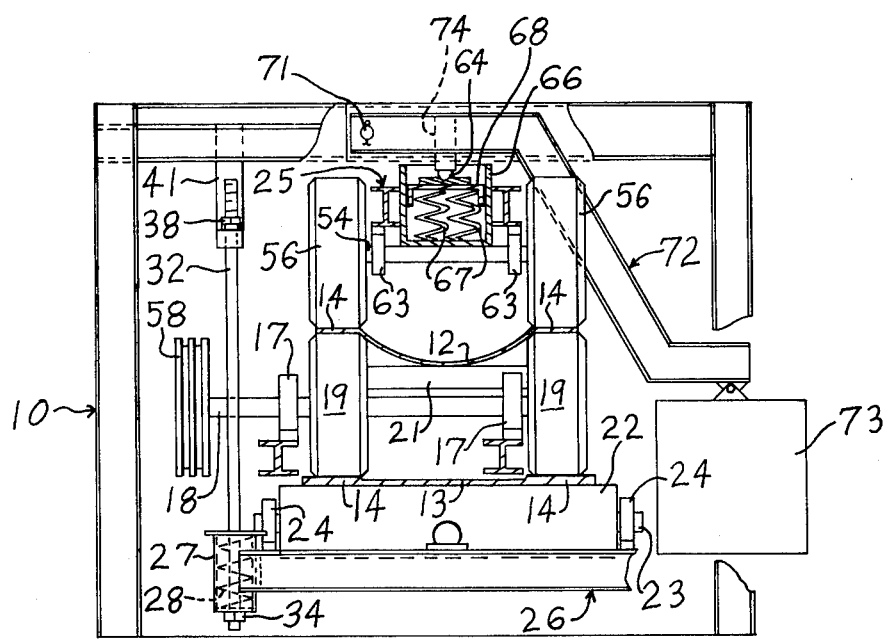
FIG. 3 is an end elevational view, partly broken away and in section, and with parts being omitted, for the sake of clarity.

Rotatable support members 22 are mounted beneath and extend transversely of the lower strand 13 of the belt 10 in position to engage the under surfaces of the marginal drive edges 14 of the lower strand opposite the drive wheels 19 whereby the lower strand 13 is pinched between the rotatable support members 22 and the drive wheels 19 and is driven by the drive wheels 19. The rotatable support members 22 are mounted on shafts 23 which rotate in suitable bearings 24 carried by a resiliently supported frame 26 which is generally rectangular in shape, as viewed in plan. Secured rigidly to each corner of the frame 26, by suitable means, is a vertically extending, generally cylindrical housing 27 for receiving a compression spring 28, as shown in FIGS. 3 and 10. Secured to the upper end of the housing 27 by suitable bolts 29 is a disc-like cover 31 which defines a spring abutment which engages the upper end of the compression spring 28. Extending through a suitable opening in the disc-like cover 31 and downwardly through the compression spring 28 is an elongated rod-like member 32 having a threaded lower end 33 for receiving a nut 34. Mounted on the rod-like member 32 between the nut 34 and the spring 28 is a washer 36. The upper end of the rod-like member 32 is threaded as at 37 for receiving retaining nuts 38. As shown in FIGS. 3 and 11, the upper end of the rod-like member 32 extends through a suitable opening or recess 39 provided in a support bracket 41, which in turn is secured to the supporting frame 10.

Figure 20:
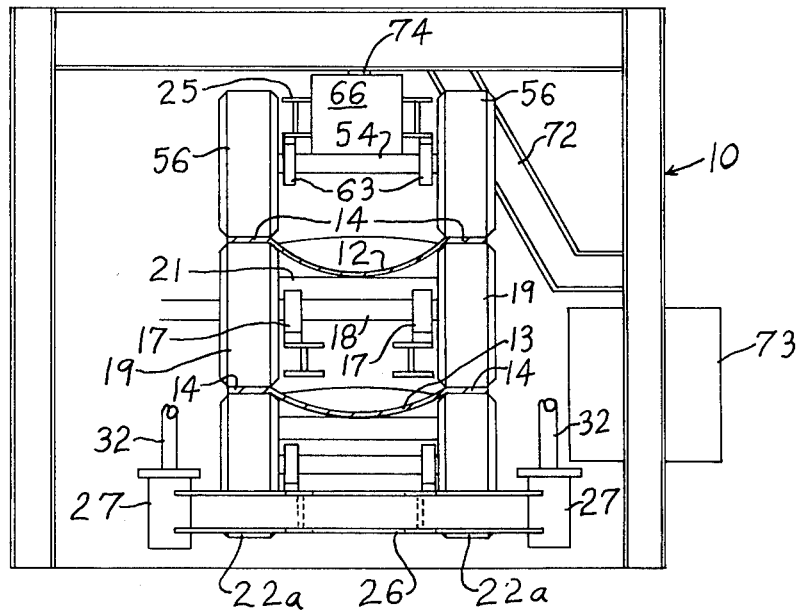

As shown in FIG. 20, the rotatable support members 22 are in the form of wheels $22^a$ when it is desired to convey materials on both the upper flight 12 and the lower flight 13, such as would be the case when the upper conveying flight 12 carries ore, coal or the like removed from a mine while the lower return flight 13 carries tailings back to the mine. The wheels $22^a$ are supported by shafts 23 which in turn are carried by a resiliently supported frame 26, as described hereinabove.

Figure 12:
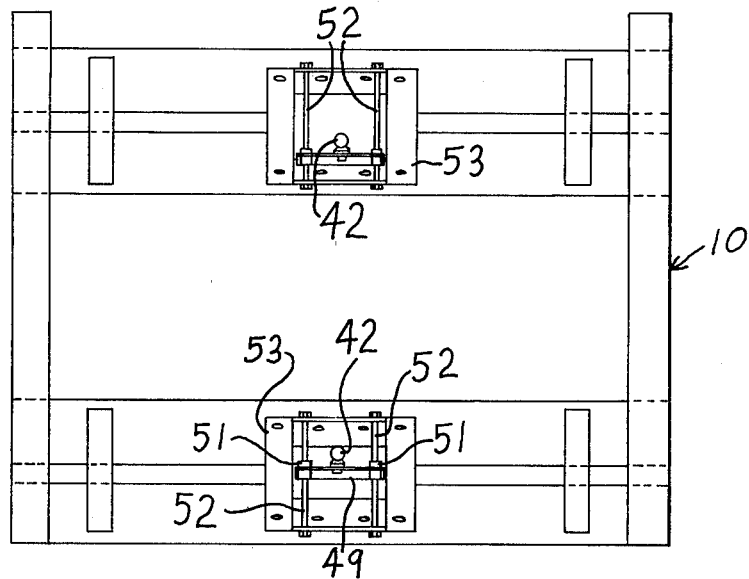
FIG. 12 is a view taken generally along the line 12—12 of FIG. 4 with the adjacent portions of the floating frame and resiliently mounted frame being omitted for the sake of clarity.
Figure 13:
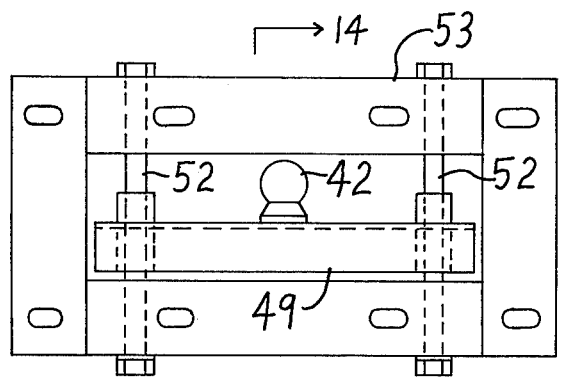
FIG. 13 is an enlarged view showing the vertically movable bracket and the guide means therefor.
Figure 14:
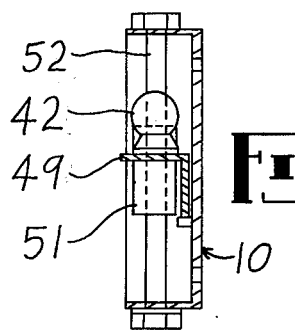
FIG. 14 is a sectional view taken generally along the line 14—14 of FIG. 13.

A floating frame 25 is operatively connected to the supporting frame 10 and is adapted for movement relative thereto. As shown in FIGS. 8 and 9, the frames 25 and 26 are operatively connected to the supporting frame 10 by lost motion connections adjacent one end of the floating frame 25 and at the opposite end of the resiliently mounted frame 26. Each lost motion connection comprises cooperating ball and socket elements 42 and 43, respectively. The socket element 43 is carried by a bracket 44 which extends between upstanding angle brackets 46 carried by each frame 25 and 26. Elongated openings 47 are provided in the brackets 46 at the forward end of the frames 25 and 26, as viewed in the direction of travel of the belt flights 12 and 13, for receiving laterally projecting pins 48 carried by the brackets 44 whereby these brackets 44 are adapted for horizontal movement relative to the angle brackets 46. Elongated openings 47 are also provided in the brackets 46 at the rear ends of the frames 25 and 26, as viewed in the direction of travel of the belt flights 12 and 13, for receiving bolts $48^a$ carried by the brackets 44 whereby these brackets 44 are fixed to the angle brackets 46, after installation, by suitable retaining nuts. The ball element 42 is carried by a movable bracket 49 having bearing members 51 adjacent each end thereof which receive vertically extending, spaced apart guide rods 52 which are secured to a generally rectangular support bracket 53, as shown in FIGS. 12 and 13, which in turn is secured rigidly to the supporting frame 10. Accordingly, the ends of the frames 25 and 26 are adapted for vertical movement relative to the supporting frame 10.

Upper axles 54 are carried by the floating frame 25 and are spaced from each other in the direction of travel of the conveyor belt 11. Also, the upper axles 54 extend transversely of the travel of the belt 11 and parallel to the axle 18. Upper wheels 56 are carried by the axles 54 in position to engage the upper surfaces of the marginal drive edges 14 of the upper strand 12 of the belt opposite the drive wheels 19 whereby the upper strand 12 is pinched between the upper wheels 56 and the drive wheels 19 and is driven by the drive wheels 19.

As shown in FIGS. 1 through 3, the drive axles 18 are operatively connected to a power unit 57 to provide a common drive assembly. That is, the spaced apart drive axles 18 carry sprockets 58 which are connected to each other by a sprocket chain 59. The sprocket 58 nearest the power unit 57 is operatively connected to the power unit 57 by a sprocket chain 61 which passes around a sprocket 62 carried by the power unit 57. As clearly shown in FIG. 3, the axles 54 are supported by bearing members 63 which are positioned inwardly of the upper wheels 56 whereby the pneumatic tire and wheel assembly may be readily installed and removed. Also, the bearing member 17 supporting the drive axle 18 adjacent the opposite end thereof from the sprocket 58 is positioned inwardly of the pneumatic tire carried by the wheel 19 whereby the tire may be readily installed or removed where necessary. The wheels 19, $22^a$ and 56 carry conventional type pneumatic tires which may be installed on their wheels or removed therefrom in the usual manner.

As shown in FIGS. 1, 3, 4 and 6, downward pressure is applied to the floating frame 25 at a pivot point 64 substantially equidistant from the upper wheels 56 with the floating frame being adapted to swivel about the pivot point to selected positions relative to the upper strand 12 of the conveyor belt 11. A generally rectangular housing 66 is mounted on the floating frame 25 adjacent the longitudinal center thereof for receiving four upstanding compression springs 67, as shown in FIGS. 3, 4 and 5. A transverse plate 68 extends across the tops of the compression spring 67 and carries a centrally disposed disc 69 having a recess therein defining the pivot point 64.

Pivotally connected to the supporting frame 10 by a pivot pin 71 is a transversely extending actuating member 72 which extends laterally across the floating frame 25 and carries a weight 73 adjacent the free end thereof, as shown in FIGS. 1 and 3. A depending member 74 is carried by the actuating member 72 in vertical alignment with the pivot point 64. The lower end of the depending member 74 is rounded so as to engage the socket in the disc member 69 which defines the pivot point 64. Accordingly, a swivel connection is provided between the depending member 72 and the pivot point 64 on the floating frame 25. While I have shown the means applying a downward pressure to the actuating member 72 as being in the form of a weight 73, it will be apparent that other suitable means may be employed to exert a downward pressure on the depending member 74 which applies pressure to the floating frame at the pivot point 64.

Figure 18:
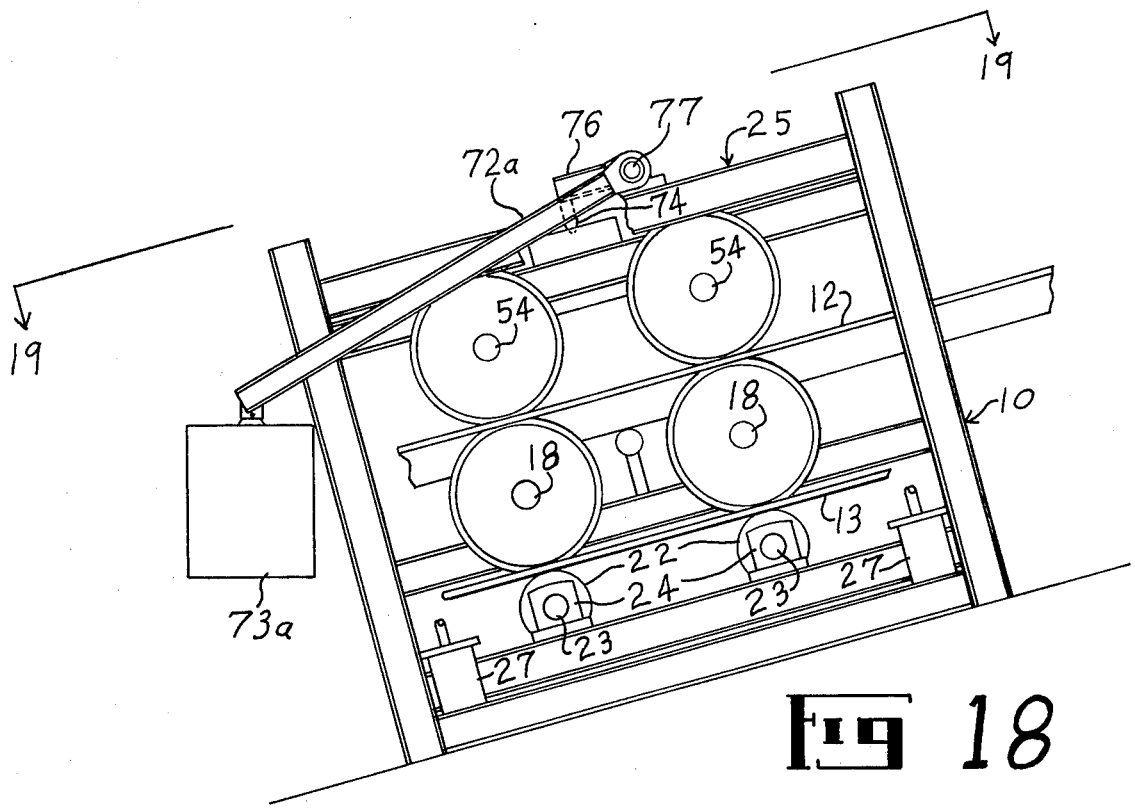
FIG. 18 is a side elevational view corresponding to FIG. 4 showing modified means for applying pressure to the floating frame.
Figure 19:
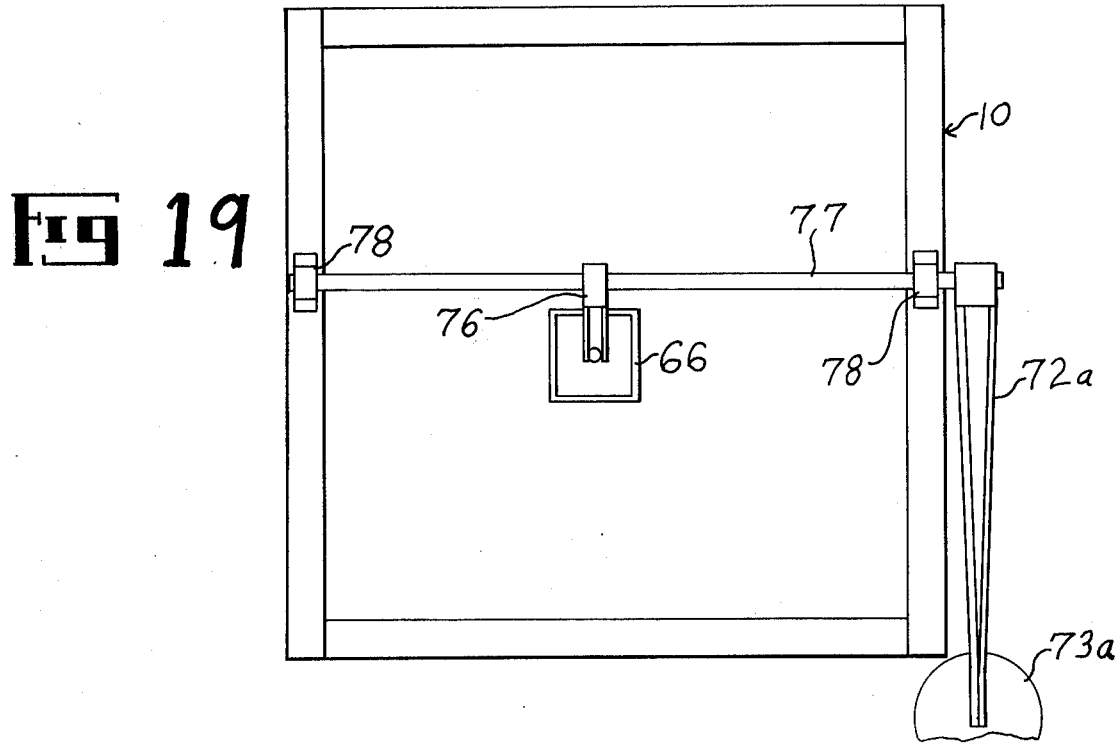
FIG. 19 is a top plan view taken along the line 19—19 of FIG. 18 showing a fragment of the supporting frame and the means for applying pressure to the floating frame with other parts being omitted for the sake of clarity; and, FIG. 20 is an end elevational view showing a modification wherein the lower flight of the conveyor belt is supported by wheels, with parts being broken away and parts being omitted.

As shown in FIGS. 18 and 19 I show a modified form of my invention wherein the depending member 74 is carried by one end of an arm 76. The other end of arm 76 is secured to a shaft 77 which extends transversely of frame 10 and is mounted for rotation in bearings 78. An elongated actuating member $72^a$ is secured to one end of shaft 77 and extends at right angles relative thereto. A weight $73^a$ is carried by the other end of the actuating member $72^a$ as shown. The elongated actuating member $72^a$ thus extends alongside the frame 10 so that there is complete freedom of movement thereof where the frame 10 is mounted on an inclined surface as well as on level surfaces. The weight $73^a$ applies downward pressure to the depending member 74 and performs the same function as weight 73.

The conveying flight 12 of the belt 11 is guided as it moves to the right, as viewed in FIG. 15, into the belt drive assembly by a series of self-aligning, troughing idler roll assemblies 79 and a series of fixed, troughing idler roll assemblies 81 which are spaced from each other as shown. The idler roll assemblies 79 and 81 are mounted on longitudinally extending support members 82, which may be in the form of spaced apart channel-like members. One end of each support member 82 is attached to the supporting frame 10 while the other ends thereof carry a suitable connector element for attaching one end of wire rope 83. The other end of the wire rope 83 is connected to the next drive assembly for the belt 11. As shown in FIG. 15, the support members 82 are mounted on adjustable supports or jacks 84 whereby the support members 82 may be supported at selected elevations.

From the foregoing, it will be seen that I have devised an improved apparatus for driving an endless conveyor belt. By providing a floating frame which permits the individual wheels thereof to move to selected positions relative to the upper strand of the conveyor belt, the individual wheels are adapted to move over objects 20, such as rocks, coal, ore and the like which are carried by the marginal drive edges of the conveyor belt. Accordingly, such objects are not depressed into the marginal drive edges of the belt as the belt passes beneath the upper wheels carried by the floating frame. Also, by providing movement of the floating frame 25 and the resiliently supporting frame 26 relative to the supporting frame 10, these frames and the belt engaging members carried thereby readily accommodate themselves to the path of movement of the conveyor belt. That is, the frames 25 and 26 are adapted to move to selected positions about an axis extending transversely or longitudinally of the conveyor belt to thus assure smooth operation of the drive assembly as the belt travels therethrough. Also, by providing resilient means between the floating frame and the means applying downward pressure to the floating frame, shock is absorbed whereby the wheel passing over an object carried by the marginal drive edge of the belt moves upwardly without damage to the apparatus. That is, upward movement of the wheels carried by the floating frame is cushioned by this resilient means. Also, by resiliently supporting the frame 26 which carries the rotatable support members or wheels that engage the lower strand of the belt, such rotatable support members hold the lower strand in firm engagement with the drive wheels 19 until an object carried by the marginal drive edge of the belt passes therebetween. Furthermore, by providing means for guiding the conveying flight into the drive assembly, the belt is held in proper alignment whereby wear is reduced and the belt moves smoothly into the drive assembly. Furthermore, by providing an actuating member $72^a$ which extends in a plane generally parallel to the direction of movement of the conveyor belt, the drive assembly may be mounted on inclined surfaces as well as on level surfaces.

While I have shown my invention in but one form, it will be obvious to those skilled in the art that it is not so limited, but is susceptible of various changes and modifications without departing from the spirit thereof.

What I claim is:

1. Apparatus for driving an endless conveyor belt having upper and lower strands with marginal drive edges thereon,
   a. a supporting frame extending transversely of said belt,
   b. a pair of drive axles mounted in said supporting frame and spaced from each other in the direction of travel of said belt and extending transversely of the direction of travel of said belt,
   c. drive wheels carried by each said drive axle for driving engagement with the under surfaces of the marginal drive edges of the upper strand of said belt and for driving engagement with the upper surfaces of the marginal drive edges of the lower strand of said belt,
   d. at least one rotatable support member mounted beneath said lower strand of said belt in position to engage the under surfaces of the marginal drive edges of the lower strand of said belt opposite said drive wheels so that said lower strand is pinched between said rotatable support member and said drive wheels and is driven thereby,
   e. a floating frame operatively connected to said supporting frame and adapted for movement relative thereto,
   f. upper axles carried by said floating frame and spaced from each other in the direction of travel of said belt and extending transversely of the direction of travel of said belt, g. upper wheels carried by said upper axles in position to engage the upper surfaces of the marginal drive edges of the upper strand of said belt opposite said drive wheels so that said upper strand is pinched between said upper wheels and said drive wheels and is driven thereby, and h. means to apply downward pressure to said floating frame at a pivot point substantially equidistant from said upper wheels with said floating frame being adapted to swivel about said pivot point to selected positions relative to said upper strand.

2. Apparatus for driving an endless conveyor belt as defined in claim 1 in which said rotatable support member is carried by a resiliently mounted frame.

3. Apparatus for driving an endless conveyor belt as defined in claim 2 in which said resiliently mounted frame is operatively connected to said supporting frame by lost motion connections adjacent one end of said resiliently mounted frame.

4. Apparatus for driving an endless conveyor belt as defined in claim 1 in which said rotatable support member is adjustably supported from said supporting frames.

5. Apparatus for driving an endless conveyor belt as defined in claim 1 in which said rotatable support member comprises lower wheels mounted in position to engage the under surfaces of the marginal drive edges of the lower strand of said belt opposite said drive wheels.

6. Apparatus for driving an endless conveyor belt as defined in claim 1 in which resilient means is interposed between said floating frame and said means to apply downward pressure to said floating frame.

7. Apparatus for driving an endless conveyor belt as defined in claim 6 in which said resilient means comprises a spring unit carried by said floating frame in position to be engaged by said means applying downward pressure.

8. Apparatus for driving an endless conveyor belt as defined in claim 1 in which said means to apply downward pressure to said floating frame comprises, a. an actuating member disposed to exert a downward force toward said pivot point, b. a depending member carried by said actuating member in vertical alignment with said pivot point, and c. a swivel connection between said depending member and said pivot point on said floating frame.

9. Apparatus for driving an endless conveyor belt as defined in claim 8 in which said actuating member comprises, a. a lever arm pivotally connected adjacent one end to said supporting frame, and b. means applying a downward force to the other end of said lever arm with said depending member being carried by said lever arm intermediate said one end and said other end thereof.

10. Apparatus for driving an endless conveyor belt as defined in claim 9 in which said means applying a downward force to said other end of said lever arm comprises a weight carried by said other end of said level arm.

11. Apparatus as defined in claim 8 in which said actuating member comprises, a. a shaft extending transversely of said supporting frame and mounted for rotation thereon, b. a first arm connected at one end to said shaft with the other end of said first arm extending over said depending member, c. a second arm connected at one end to said shaft and extending generally at right angles thereto, and d. a weight carried by the other end of said second arm.

12. Apparatus for driving an endless conveyor belt as defined in claim 1 in which said pair of drive axles are operatively connected to a common drive assembly.

13. Apparatus for driving an endless conveyor belt as defined in claim 1 in which said upper axles are supported by bearing units mounted on said floating frame inwardly of said upper wheels.

14. Apparatus for driving an endless conveyor belt as defined in claim 1 in which said floating frame is operatively connected to said supporting frame by a lost motion connection adjacent one end of said floating frame which permits longitudinal and vertical movement of one end of said floating frame relative to the supporting frame and permits only vertical movement of the other end of said floating frame.

15. Apparatus for driving an endless conveyor belt as defined in claim 14 in which each said lost motion connection comprises, a. cooperating ball and socket elements having one element thereof connected to an end of said floating frame adjacent the longitudinal center thereof and adapted for limited longitudinal movement relative to said floating frame, and b. means connecting the other element of said cooperating ball and socket elements to a movable bracket mounted for vertical movement relative to said supporting frame.

16. Apparatus for driving an endless conveyor belt as defined in claim 15 in which said bracket is mounted for vertical sliding movement on at least one vertical guide member carried by said supporting frame.

17. Apparatus for driving an endless conveyor belt as defined in claim 15 in which said movable bracket is an elongated member extending transversely of the direction of travel of said belt with bearing members adjacent each end thereof for receiving spaced apart vertical guide rods carried by said supporting frame.

18. Apparatus for driving an endless conveyor belt as defined in claim 1 in which guide means is mounted at the receiving end of said supporting frame, as viewed in the direction of movement of the conveying flight of said belt, so that said conveying flight is aligned with and moves in a straight line through said supporting frame.

19. Apparatus for driving an endless conveyor belt as defined in claim 18 in which said guide means comprises:

a. a series of self-aligning idler roll assemblies spaced from each other and spaced from said supporting frame, and b. a series of fixed idler roll assemblies spaced from each other and positioned between said supporting frame and said self-aligning idler roll assemblies.

\* \* \* \* \*